June 20, 1961 W. MIEHLE 2,989,734

BINARY COMPARER

Filed Oct. 19, 1955

*INVENTOR.*
WILLIAM MIEHLE

*BY* George Baron

ATTORNEY

United States Patent Office 2,989,734

Patented June 20, 1961

2,989,734
BINARY COMPARER

William Miehle, Havertown, Pa., assignor to Burroughs Corporation, Detroit, Mich., a corporation of Michigan Filed Oct. 19, 1955, Ser. No. 541,358
7 Claims. (Cl. 340—174)

This invention relates broadly to computing or calculating devices and more particularly to a system for comparing the identity of two binary expressions.

In computing or calculating devices, it is often necessary to obtain, at any given instant, an indication whether or not two expressions read into or about to read into a computing device are identical. An expression will consist of a plurality of binary characters or bits. For example, the expression $X_1$ can be represented by the bits a, b, c, d, e. The expresion $X_2$ can be represented by the bits p. q, r, s, t. In the instant example, the expresions to be compared are each composed of five characters. It is to be understood that any number of $n$ characters can comprise an expression.

The characters that comprise the expression can be stored in a variety of ways employing mechanical or electrical means. However, for my preferred embodiment, I employ a bistable element as the information or character storing means. Such bistable element may be a condenser comprising a slab or ferroelectric material and a pair of electrodes on opposite faces of said ferroelectric material. This type of bistable element is described in the Anderson Patent No. 2,695,396. The bistable element also may be a ferromagnetic substance such as is described in the Booth Patent No. 2,680,819. In either case, the bistable elements have substantially rectangular hysteresis curves, and one stores information in binary form in such elements by setting them in one binary state (called the "1" state) or in the opposite binary state (called the "0" state), utilizing a changing magnetic field to alter the state of the ferromagnetic core and a changing electrical potential across the ferroelectric substance to change its state.

It is an object of this invention to employ bistable elements in a novel manner so as to effect the comparison of two expressions utilizing as few elements as possible to make such comparisons.

It is a further object to provide a simple and reliable system for comparing two expressions regardless of the number of characters in each expression.

Applicant achieves the above noted objects by employing a pair of bistable elements for each pair of characters to be compared, but only one bistable element or only one sensing means to detect dissimilarity between any pair of compared characters. If an expression $X_1$ were to consist of the characters abcde . . ., and another $X_2$ were to consist of the characters pqrst . . ., applicant utilizes a single signal pulse, representative of the character a, to set a first bistable element and its companion bistable element into "0" and "1" states, respectively. Applicant utilizes a second signal pulse representative of the character p (the character that is to be compared simultaneously with the character a) to set the same first bistable element and the same companion bistable element into "1" and "0" states respectively. In this manner, the presence of a and p, if a is equal to p, will cancel each other's effect on said bistable elements. However, if a and p are not equal to each other, such inequality or dissimilarity will be evidenced by the fact that the presence of a will not have a canceling effect on a bistable core because of the presence of p. The aforementioned procedure is applied to other pairs of bistable elements for every pair of characters (b, q), (c, r) etc. Soon after all signals representative of the compared characters are simultaneously applied to the bistable elements, applicant applies an interrogating pulse to all the bistable elements to test the state of such bistable elements. The interrogating pulse is of such a polarity as to switch all the pairs of bistable elements to the same reference state. The dissimilarity of any pair of characters (a, p), (b, q), etc. will result in an output signal or signals being generated in output circuits associated with said bistable elements when the interrogating pulse is applied. Such output signal or signals can be sensed by a single sensing means. In this manner one may test for the identity of two expressions, each having $n$ characters, wherein one need only use $2n+1$ bistable elements to make the comparison.

Figure 1:
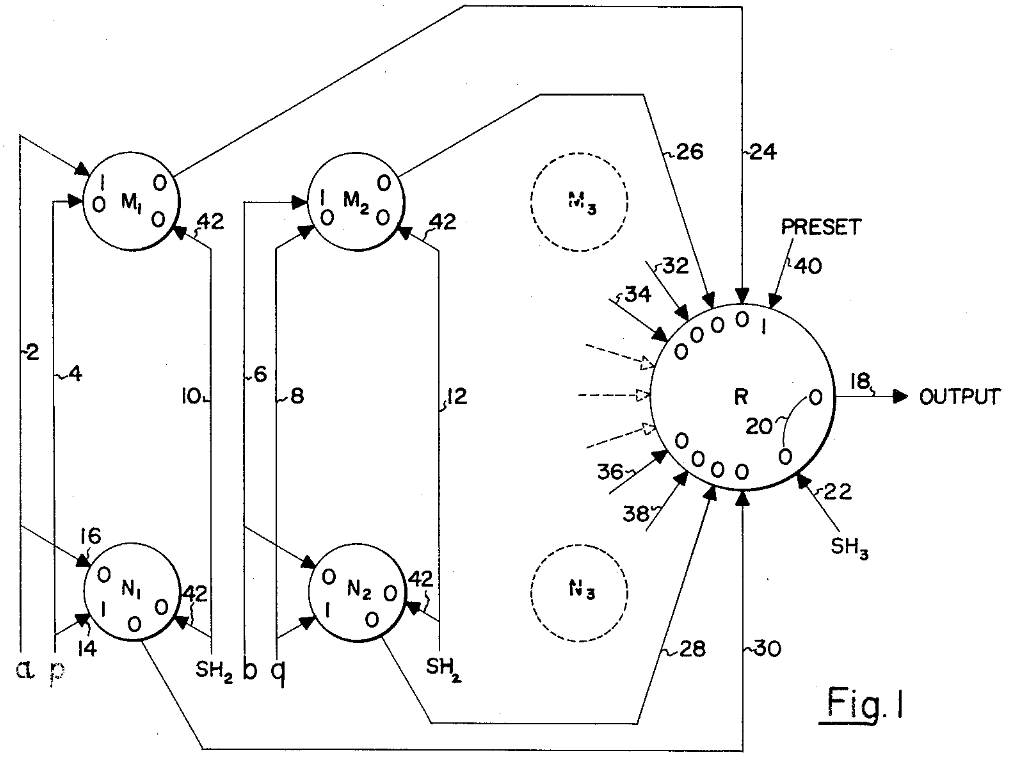
FIGURE 1 is a representation of a circuit embodying the invention in symbolic form.

FIGURE 1 shows a series of bistable elements $M_1$, $M_2$, $M_3$, etc., which represent the elements to which will be applied concurrently the signal pulses representing the respective terms of both expression a, b, c, d and e, and expression p, q, r, s and t. To simplify the presentation only elements $M_1$ and $M_2$ are shown connected, since all other elements are connected in a similar manner. For purposes of description only, the bistable elements are shown as ferromagnetic cores similar to those shown in the Booth Patent No. 2,680,819 noted above, but it can be readily seen that one could modify the instant invention in the manner shown by Anderson in his Patent No. 2,695,396 to substitute ferroelectric storage elements for the ferromagnetic cores of the instant invention.

The signal pulses representing the expression p, q, r, s, t and the expression a, b, c, d, e which are to be compared also are applied to cores $N_1$, $N_2$, $N_3$, etc. Such cores are similar to cores $M_1$, $M_2$, $M_3$, etc. The character or bits a and p are both applied to cores $M_1$ and $N_1$ with bit a applied to both cores simultaneously. The character a would be a signal pulse which is carried by lead 2 into input windings, not shown, that are coupled to the cores $M_1$ and $N_1$. The input winding on core $M_1$ is oppositely wound to the input winding of core $N_1$ so that the presence of the signal pulse a in conductor 2 will tend to place core $M_1$ in its "1" state and tend to place core $N_1$ in its "0" state. Similarly, the presence of character p as a signal pulse will cause current flow in lead 4 so that core $N_1$ will be placed in its "1" state by such current but core $M_1$ will be placed in its "0" state by the same current pulse. The input winding on core $N_1$ associated with conductor 4 is wound opposite to the input winding on core $M_1$ that is associated with the same conductor 4 to attain a similar but opposite polarity effect from character p as that obtained when the signal pulse representing character a was applied to cores $M_1$ and $N_1$.

In the same manner, character b is associated with cores $M_2$ and $N_2$ through lead 6 and character q is associated with cores $M_2$ and $N_2$ through lead 8. The apparatus associated with the remaining characters c, d, e that complete the expression $X_1$ and characters r, s, t that complete the expression $X_2$ is not shown in FIGURE 1, but it is understood that the characters will be associated with other bistable elements in the same manner that characters a, b and p, q are associated with their respective bistable storage elements.

Associated with each pair of cores $M_1N_1$, $M_2$ and $N_2$, are shifting windings 10, 12, etc. which tend to drive all such cores $M_1N_1$, $M_2N_2$, etc. into their "0" states whenever a shifting pulse $SH_2$ is applied to such windings 10, 12, etc. Shifting pulses $SH_2$ are "clock" pulses which are applied simultaneously to all the cores $M_1N_1$, $M_2N_2$, etc.

at regular or controlled intervals so as to interrogate the state of the storage cores.

In the symbolic notation of FIGURE 1, an arrow pointing into a bistable magnetic core and touching the core at its circumference signifies an input winding circuit. The numbers "1" and "0" at the arrow signify the binary condition into which the core is placed by an input pulse entering the core through a winding represented by such an arrow. Thus arrow 14 indicates that a signal pulse causing current flow in the winding circuit associated with core $N_1$ will set core $N_1$ into its binary "1" state. The arrow 16 indicates that a signal pulse appearing on conductor 2 will cause current flow in another winding circuit associated with core $N_1$ so as to set such core into its binary "0" state. A lead touching the core circumference without an arrow indicates that an output signal is produced in the output winding associated with a core when the core has been switched to the binary state shown at the foot of the lead. Thus lead 18 on the result core R indicates that an output pulse will result when result core R has been switched from its binary "1" state to its binary "0" state. The arc or "eyebrow" 20 that spans the two windings of result core R indicate a conditional transfer circuit wherein an output signal through lead 18, can result if, and only if, the core R is switched to its "0" state from a current pulse entering that input winding of core R which is represented symbolically by arrow 22. The switching of result core R from its "1" state to its "0" state by signal pulses entering core R through arrows such as 24, 26, 28, 30, 32, 34, 36, 38, etc. does not result in an output at lead 18. Such a conditional output circuit is carried out by proper orientation of winding and diodes in the output circuit of core R as described and claimed in the co-pending U.S. application S.N. 420,135, now abandoned, filed for "Magnetic Device" by John O. Paivinen on March 31, 1954, and assigned to the same assignee as applicant's assignee. The subject matter of abandoned application S.N. 420,135 has been incorporated in continuation application S.N. 762,863, filed September 23, 1958, and entitled "Magnetic Shift Register."

Figure 4:
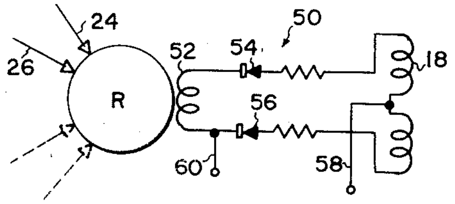
FIGURE 4 is an example of a conditional transfer loop utilized in the instant invention.

FIGURE 4 is an example of such conditional output circuit. A transfer loop 50 couples the result core R with the output winding 18. In this case output winding 18 is split into substantially equal parts. Winding 52 is coupled to result core R. Diodes 54 and 56 prevent the transfer of information from result core through the transfer loop whenever result core R switches. The diodes isolate the output of result core R from output winding 18. However, if a signal pulse, such as signal pulse $SH_3$, is sent through lead 58, such signal pulse will cause current flow through the upper branch of winding 18, resistor, diode 54, winding 52 and out through lead 60 as well as through the lower branch of winding 18, resistor, diode 56 and out through lead 60. The signal pulse $SH_3$ is an enabling pulse in that it enables the transfer loop 50 to overcome the blocking effect of the diodes 54 and 56. If result core R is in a "1" state, the split current that passes through winding 52 will switch the core to its "0" state, causing a back E.M.F. to be generated in winding 52. This back E.M.F. will cause more current flow in the lower branch of the transfer loop than in the upper branch of the transfer loop, resulting in a difference of potential appearing across winding 18. This difference of potential can be sensed by an suitable detecting means. Thus, as is explained in greater detail in said co-pending Paivinen application, one can obtain a conditional output from result core R whereby the output winding 18 of result core R is effectively isolated from the result core during switching of such core unless an enabling current is present in applicant's conditional transfer loop 50.

Assume that it is desired to compare the expression $X_1$ and $X_2$ and that each expression contains five characters a, b, c, d, e and p, q, r, s, t respectively. At time $t_1$ the expressions a, b, c, d, e and p, q, r, s, t are read simultaneously into the bistable storage devices $M_1$, $M_2$, etc. and into the parallel group of bistable storage devices $N_1$, $N_2$, etc. At time $t_1$ result core R is preset through a winding represented symbolically by arrow 40 to its binary "1" state. At a time $t_2$ after time $t_1$, a shifting pulse $SH_2$ is sent through conductors 10, 12, etc. so as to send a current pulse through the windings associated with the storage cores, said windings being represented symbolically by arrows 42. The shifting pulse will tend to shift all the storage cores to their "0" states. If the storage cores are in their "1" states when the shifting pulse $SH_2$ is applied, output signals will be produced in conductors 24, 26, 28, 30, etc. Such output signals will switch result core R to its "0" state, since result core R, as a consequence of the above-mentioned preset pulse, was set to its binary "1" state. The switching of result core R to its "0" state will not produce an output signal at 18 because of the conditional transfer circuitry 20 of the output winding of result core R.

It is noted that should any core $M_1$, $M_2$, $N_1$, $N_2$, etc., be in its "0" state when the shifting pulse $SH_2$ is applied to such core, no output pulse is produced in their associated conductors 24, 26, 28, 30, etc. At least, such output pulse is negligible and does not switch result core R to its "0" state.

In making the comparison and in order to follow the operation of applicant's novel comparator assume that all the storage cores are in their "0" states initially and that the binary expressions $X_1$ and $X_2$ are identical. Hence a<=>p ("<=>" representing identity or material equivalence), b<=>q, c<=>r, etc. Signal pulse a will tend to store a "1" in core $M_1$ and a "0" in core $N_1$. Signal pulse p will tend to store a "0" in core $M_1$ and a "1" in core $N_1$. Since signal pulses a and p occur simultaneously, the two tendencies, namely, reading in a "1" and reading in a "0," will oppose each other, leaving cores $M_1$ and $N_1$ in their initial "0" states. In a similar manner, cores $M_2$, $N_2$, etc., will remain in their "0" states. Now at time $t_2$ when shifting pulse $SH_2$ is applied to the storage cores, such cores each being in a "0" state, no significant output is produced in conductors 24, 26, 28, 30, etc. Core R remains in its "1" state because there have been no output pulses from the storage cores to change such state. At time $t_3$ a shifting pulse $SH_3$ is applied to result core R, such pulse tending to switch binary result core R to its "0" state and produce an output at 18 if, and only if, result core R is in its "1" state. Thus the presence of an output pulse from result core R as a consequence of the application of a shifting pulse $SH_3$ is proof of the identity of the two expressions $X_1$ and $X_2$. Obviously the preset is unnecessary if it be desirable to indicate the comparison by a lack of output signal.

An example of two identical expression is $X_1$=10000 and $X_2$=10000 where a=1, b=0, c=0, d=0 and e=0 and p=1, q=0, r=0, s=0 and t=0. Now assume that expression $X_1$ differs from $X_2$ because the character b is not identical to the character g. By conventional binary notation, expression $X_1$ can also be expressed as a sequence of zeros and ones. In accordance with the above assumption, $X_1$=10000 and $X_2$=11000. In the example chosen to illustrate lack of material equivalence between expressions $X_1$ and $X_2$, all corresponding pairs of signals a, p, etc. are identical except the pair b, q. Consequently, all the cores save core $M_2$ and core $N_2$ will be in a "0" storage state, and therefore can not produce an output signal to switch result core R from its present "1" state to its "0" state. Since b is a "0" signal, no current appears on conductor 6 and cores $M_2$ and $N_2$ remain in their initial "0" states, being unaffected by the b signal. However q is a "1" signal and its presence causes core $N_2$ to switch to its "1" state and core $M_2$ to remain in its "0" state. Now when shifting pulse $SH_2$ is applied to the cores, core $N_2$ is switched to its "0" state to produce an output pulse in conductor 28, said output pulse setting result core R to its "0" state. When at time $t_3$ shifting pulse $SH_3$ is applied to the shift winding 22 associated with result core R, core R is in its "0" state, and no output is seen at 18. The failure to record an output is an indication that the expressions compared are not identical.

If desired, one may dispense with the requirement for shifting pulse $SH_3$ to test the material equivalence of the compared expressions by employing an unconditional output circuit instead of a conditional output circuit for result core R. Thus, when result core R has been preset to its "1" state, the lack of material equivalence between any compared pair of characters will cause a first output pulse from at least one of the bistable storage elements $M_1$, $N_1$, $M_2$, $N_2$, etc. to switch the result core R, and such first output pulse or pulses would switch preset core R from its "1" state to its "0" state, causing a second output pulse, said second output pulse indicating a dissimilarity between the compared expressions. The comparison would occur at substantially the same time as the shifting pulse $SH_2$. It is also recognized that such first output pulses could be sensed by any means other than result core R, and that the output signal may be taken in response to switching of the core by the preset signal.

It can be readily seen in like manner any lack of material equivalence between any pair of characters being compared will cause result core R to switch to its "0" state. If more than one pair of characters are not materially equivalent, then a plurality of signal pulses will appear at result core R through conductors such as conductors 24–38. But since only one signal pulse is sufficient to switch result core R, a plurality of output signal pulses emanating from the storage cores as a consequence of the application of a shifting pulse $SH_2$ to such cores will not alter the effect on result core R.

Figure 2:
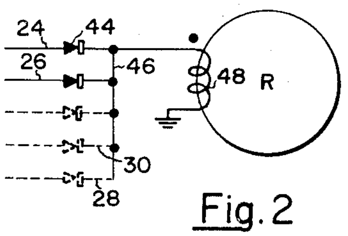
FIGURES 2 and 3 are exemplary means for reading a plurality of signals into a single result core for indicating the conclusion arrived at by the character comparison circuits.

In FIGURE 2 there is schematically shown a circuit wherein the output signals from storage cores $M_1$, $M_2$, $N_1$, $N_2$, etc., are fed into result core R at a single input winding 48. The output pulses from the storage cores will cause current flow through diodes 44, into connecting branch 46, then through the dotted terminal of winding 48, the dotted terminal being a conventional representation that the core associated with the winding 48 will be switched to a "0" state if switching current enters the dotted terminal of said winding. It is readily recognized that the output signal pulses from cores $M_1$, $M_2$, etc. and the output signal pulses from cores $N_1$, $N_2$, etc. may be grouped in any arbitrary manner, since we are interested in the output rather than the specific conductor 24, 26, etc. which carries such output signal pulses.

Figure 3:
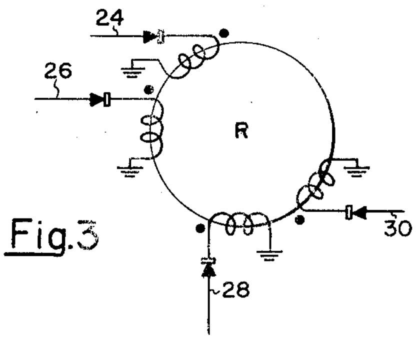

If it is desired, each output conductor 24—38 may be connected to an individual winding about reset core R as shown in FIGURE 3 instead of relying on the branched technique of FIGURE 2. The wiring techniques are optional and require only that the presence of a lack of material equivalence in any pair of characters being compared result in a detectable output indication, after application of a switching pulse $SH_2$ to such cores containing stored comparison signals.

The instant invention is especially adapted for use in computing devices employing bistable ferromagnetic or ferroelectric elements as information storage elements because such elements retain their stored information despite power failure, generate relatively little heat during operation, are rugged, reliable, and generally quite inexpensive.

From the foregoing it is seen that the present invention needs only $2n+1$ bistable elements to compare two expressions wherein each expression consists of $n$ characters, resulting in an economical comparator. The hereinabove described comparator can compare two expressions, each having a relatively large number of characters, quickly and reliably. The time of comparison is accomplished in three sequential signals which may be presented in a few microseconds so that the comparison of the two expressions may be determined quickly.

What is claimed is:

1. A comparator for comparing two binary expressions each composed of "$n$" bits, said comparator comprising "$n$" pairs of bistable magnetic cores, each pair being associated with a different one of said bits, each core being capable of assuming either a set or a reset state; a single bistable magnetic output core; preset means for presetting during time period $t_1$ said single output core to a reference magnetic state; a plurality of first input signal means each of which is assigned to a different one of said pairs of cores, each of said first input signal means being adapted to apply to its associated pair of cores at time period $t_2$ a first signal pulse representative of one of the two to-be-compared bits to tend to switch one core of its associated pair to said set state and to tend to maintain the other core of its associated pair in said reset state; a plurality of second input signal means each of which is assigned to a different one of said pairs of cores, each of said second input signal means being adapted to apply to its associated pair of cores at said time period $t_2$ a second signal pulse representative of the other of the two to-be-compared bits to tend to maintain said one core of its associated pair in said reset state and to tend to switch said other core of its associated pair to said set state, said first and second signal pulses in the presence of substantial identity between the two bits being compared exerting opposing and substantially cancelling forces on each core of an associated pair whereby no change is effected in the magnetic states of said associated pair of cores, thereby enabling said pair cores to remain in their reset state, one of said signal pulses in the absence of substantial identity between the two bits being compared exerting an unopposed force on one core of said associated pair cores whereby this last-mentioned core switches to said set state; output circuits associated with each core of said pair cores; reset means for resetting at time period $t_3$ all of said pair cores to said reset state to develop in said output circuits an output signal in response to the switching of a pair core from said set to said reset state; transfer means for coupling said pair-core output circuits to said single output core to switch said single output core from its preset reference state to its other remanent state in response to an output signal from one or more of said pair cores during time period $t_3$; and means for applying to said single output core at time period $t_4$ a sensing signal to switch said single output core to its said other remanent state to obtain therefrom an output signal when said single output core is in said preset reference state at time period $t_4$, said time periods $t_1$, $t_2$, $t_3$ and $t_4$ occurring sequentially in that order.

2. A comparator for comparing two expressions each composed of "$n$" binary digits or bits, said comparator comprising "$n$" pairs of bistable storage devices, each pair being associated with a different one of said bits, each device being capable of assuming either a set or a reset state; a single bistable output device; preset means for presetting during time period $t_1$ said single output device to a reference state; a plurality of first input signal means each of which is assigned to a different one of said pairs of devices, each of said first input signal means being adapted to apply to its associated pair of devices at time period $t_2$ a first signal pulse representative of one of the two to-be-compared bits to tend to switch one device of its associated pair to said set state and to tend to maintain the other device of its associated pair in said reset state; a plurality of second input signal means each of which is assigned to a different one of said pairs of devices, each of said second input signal means being adapted to apply to its associated pair of devices at said time period $t_2$ a second signal pulse representative of the other of the two to-be-compared bits to tend to maintain said one device of its associated pair in said reset state and to tend to switch said other device of its associated pair to said set state, said first and second signal pulses in the presence of substantial identity between the two bits being compared exerting opposing and substantially canceling forces on each device of an associated pair whereby no change is effected in the states of said associated pair of devices, thereby enabling said pair devices to remain in their reset state, one of said signal pulses in the absence of substantial identity between the two bits being compared exerting an unopposed force on one device of said associated pair devices whereby this last-mentioned device switches to said set state; output circuits associated with each device of said pair devices; reset means for resetting at time period $t_3$ all of said pair devices to said reset state to develop in said output circuits an output signal in response to the switching of a pair device from said set to said reset state; transfer means for coupling said pair-device output circuits to said single output device to switch said single output device from its preset reference state to its other remanent state in response to an output signal from one or more of said pair devices during time period $t_3$; and means for applying to said single output device at time period $t_4$ a sensing signal to switch said single output device to its said other remanent state to obtain therefrom an output signal when said single output device is in said preset reference state at time period $t_4$, said time periods $t_1$, $t_2$, $t_3$ and $t_4$ occurring sequentially in that order.

3. A comparator for comparing two expressions each composed of "$n$" binary digits or bits, said comparator comprising "$n$" pairs of bistable magnetic cores, each pair being associated with a different one of said bits, each core being capable of assuming either a set or a reset state; a single bistable magnetic output core; preset means for presetting during time period $t_1$ said single output core to a reference magnetic state; a plurality of first input signal means each of which is assigned to a different one of said pairs of cores, each of said first input signal means being adapted to apply to its associated pair of cores at time period $t_2$ a first signal pulse representative of one of the two to-be-compared bits to tend to switch one core of its associated pair to said set state and to tend to maintain the other core of its associated pair in said reset state; a plurality of second input signal means each of which is assigned to a different one of said pairs of cores, each of said second input signal means being adapted to apply to its associated pair of devices at said time period $t_2$ a second signal pulse representative of the other of the two to-be-compared bits to tend to maintain said one core of its associated pair in said reset state and to tend to switch said other core of its associated pair to said set state, said first and second signal pulses in the presence of substantial identity between the two bits being compared exerting opposing and substantially cancelling forces on each core of an associated pair whereby no change is effected in the magnetic states of said associated pair of cores, thereby enabling said pair cores to remain in their reset state, one of said signal pulses in the absence of substantial identity between the two bits being compared exerting an unopposed force on one core of said associated pair cores whereby this last-mentioned core switches to said set state; output circuits associated with each core of said pair cores; reset means for resetting at time period $t_3$ all of said pair cores to said reset state to develop in said output circuits an output signal in response to the switching of a pair core from said set to said reset state; and means for detecting the occurrence of an output signal in said output circuits, said time periods $t_1$, $t_2$ and $t_3$ occurring sequentially in that order.

4. A comparator for comparing two expressions each composed of "$n$" binary digits or bits, said comparator comprising "$n$" pairs of bistable devices, each pair being associated with a different one of said bits, each device being capable of assuming either a set or a reset state;

a single bistable output device; preset means for presetting during time period $t_1$ said single output device to a reference state; a plurality of first input signal means each of which is assigned to a different one of said pairs of devices, each of said first input signal means being adapted to apply to its associated pair of devices at time period $t_2$ a first signal pulse representative of one of the two to-be-compared bits to tend to switch one device of its associated pair to said set state and to tend to maintain the other device of its associated pair in said reset state; a plurality of second input signal means each of which is assigned to a different one of said pairs of devices, each of said second input signal means being adapted to apply to its associated pair of devices at said time period $t_2$ a second signal pulse representative of the other of the two to-be-compared bits to tend to maintain said one device of its associated pair in said reset state and to tend to switch said other device of its associated pair to said set state, said first and second signal pulses in the presence of substantial identity between the two bits being compared exerting opposing and substantially cancelling forces on each device of an associated pair whereby no change is effected in the states of said associated pair of devices, thereby enabling said pair devices to remain in their reset state, one of said signal pulses in the absence of substantial identity between the two bits being compared exerting an unopposed force on one device of said associated pair devices whereby this last-mentioned device switches to said set state; output circuits associated with each device of said pair devices; reset means for resetting at time period $t_3$ all of said pair devices to said reset state to develop in said output circuits an output signal in response to the switching of a pair device from said set to said reset state; and means for sensing the occurrence of an output signal in said output circuits, said time periods $t_1$, $t_2$ and $t_3$ occurring sequentially in that order.

5. A comparison device for comparing first and second binary expressions comprising: first and second bistable magnetic devices, each magnetic device having first and second states of magnetic remanence; signal reset means coupled to each of said devices to reset them to said first state of remanence; said first and second magnetic devices having respectively common connected first input signal means and common connected second input signal means; said first signal means adapted to switch said first and second magnetic devices respectively into first and second states of remanence in response to an applied first binary bit signal; said second input signal means adapted to switch said first and second cores respectively into second and first states of remanence in response to an applied second binary bit signal; said first and second binary bit signals co-acting to negate each other's switching effect on said first and second magnetic devices when said first and second applied binary bit signals have identity, while further co-acting to switch one of said magnetic devices into its second state of remanence when said first and second binary bit signals lack identity; first output signal means connected to said magnetic devices to detect and store a non-identity signal when either of said magnetic devices is switched from its second state of remanence to its first state of remanence in response to a reset signal; and second output signal means coupled to interrogate said output signal means to determine if said non-identity signal is stored therein.

6. A comparison device for comparing first and second multiple bit binary expressions comprising: a plurality of pairs of first and second bistable magnetic devices, each magnetic device having first and second states of magnetic remanence; signal reset means coupled to each of said devices to reset them to said first state of remanence; each of said magnetic devices in a pair having respectively common connected first input signal means and common connected second input signal means; each of said first input signal means adapted to switch said first and second magnetic devices of its associated pair respectively into first and second states of remanence in response to an applied first expression bit signal; each of said second input signal means adapted to switch said first and second cores of its associated pair respectively into second and first states of remanence in response to an applied second expression bit signal; said first and second expression bit signals co-acting to negate each other's switching effect on an associated pair of said magnetic devices when said last-mentioned applied bit signals have identity, while further co-acting to switch one magnetic device of an associated pair into its second state of remanence when said first and second expression bit signals lack identity; first output signal means connected to each magnetic device to detect and store a non-identity signal when any of said magnetic devices is switched from its second state of remanence to its first state of remanence in response to a reset signal; and second output signal means coupled to interrogate said first output signal means to determine if said non-identity signal is stored therein.

7. A comparison device for comparing first and second multiple bit binary expressions comprising: a plurality of pairs of first and second bistable magnetic devices, each magnetic device having first and second states of magnetic remanence; signal reset means coupled to each of said devices to reset them to said first state of remanence; each of said magnetic devices in a pair having respectively common connected first input signal means and common connected second input signal means; each of said first input signal means adapted to switch said first and second magnetic devices of its associated pair respectively into first and second states of remanence in response to an applied first expression bit signal; each of said second input signal means adapted to switch said first and second cores of its associated pair respectively into second and first states of remanence in response to an applied second expression bit signal; said first and second expression bit signals co-acting to negate each other's switching effect on an associated pair of said magnetic devices when said last-mentioned applied bit signals have identity, while further co-acting to switch one magnetic device of an associated pair into its second state of remanence when said first and second expression bit signals lack identity; an output signal bistable magnetic device; preset signal means connected to said first output bistable magnetic device to set said last-mentioned device into its second state of remanence; circuitry means coupling each of said first and second bistable magnetic devices to said first output bistable magnetic device to switch said last-mentioned device into its first state of remanence in response to any of said first and second bistable magnetic devices being switched from a second state of remanence to a first state of remanence in response to a reset signal; an output signal means coupled to said output signal bistable magnetic device to apply an interrogation signal thereto which will switch said last-mentioned device to its first state of remanence if there has been an identity detected between a compared pair of said first and second binary bit signals.

References Cited in the file of this patent

UNITED STATES PATENTS

| | | |
|---|---|---|
| 2,641,696 | Woolard | June 9, 1953 |
| 2,729,808 | Auerbach et al. | Jan. 3, 1956 |
| 2,736,881 | Booth | Feb. 28, 1956 |
| 2,769,925 | Saunders | Nov. 6, 1956 |

OTHER REFERENCES

"Basic Circuitry of the Midac and Midsac" by J. E. De Turk et al., May 1954, Univ. of Michigan Engineering Research Institute, 1947, 2–T., pp. II–10–II–12.

"Logical and Control Functions Performed with Magnetic Cores" by S. Guterman et al., March 1955, "Proc. of the IRE," pp. 291–298.